US012559152B1

(12) United States Patent
Robbins

(10) Patent No.: US 12,559,152 B1
(45) Date of Patent: Feb. 24, 2026

(54) SELF-POWERED MOBILE CART

(71) Applicant: Joseph Morris Robbins, Long Beach, CA (US)

(72) Inventor: Joseph Morris Robbins, Long Beach, CA (US)

( * ) Notice: Subject to any disclaimer, the term of this patent is extended or adjusted under 35 U.S.C. 154(b) by 0 days.

(21) Appl. No.: 19/077,026

(22) Filed: Mar. 11, 2025

(51) Int. Cl.
B62B 5/00 (2006.01)
B62B 3/00 (2006.01)
B60L 8/00 (2006.01)

(52) U.S. Cl.
CPC ............ B62B 5/0036 (2013.01); B62B 3/002 (2013.01); B62B 5/0013 (2013.01); B62B 5/0053 (2013.01); B62B 5/0076 (2013.01); B60L 8/003 (2013.01); B62B 2202/70 (2013.01); B62B 2301/20 (2013.01); B62B 2301/25 (2013.01)

(58) Field of Classification Search
CPC ..... B62B 5/0036; B62B 3/002; B62B 5/0013; B62B 5/0053; B62B 5/0076; B62B 2202/70; B62B 2301/20; B62B 2301/25; B62B 2202/52; B62B 3/007; B62B 5/0046; B60L 8/003
See application file for complete search history.

(56) References Cited

U.S. PATENT DOCUMENTS

| | | | | | |
|---|---|---|---|---|---|
| 3,669,464 | A | * | 6/1972 | Linzmeier | B62B 3/102 |
| | | | | | 211/49.1 |
| 4,930,844 | A | * | 6/1990 | Giroux | B60B 27/023 |
| | | | | | 301/64.704 |
| 5,449,224 | A | * | 9/1995 | Johnson | B62B 3/04 |
| | | | | | 298/2 |
| 6,206,385 | B1 | * | 3/2001 | Kern | B62B 3/008 |
| | | | | | 280/47.35 |
| 6,733,026 | B1 | * | 5/2004 | Robberson | B62B 3/007 |
| | | | | | 280/30 |
| 7,762,363 | B1 | * | 7/2010 | Hirschfeld | B60K 1/04 |
| | | | | | 280/651 |
| 8,453,771 | B1 | * | 6/2013 | Hirschfeld | B60L 8/003 |
| | | | | | 180/19.1 |
| 9,033,347 | B1 | * | 5/2015 | Westrate | B62B 3/02 |
| | | | | | 280/47.12 |
| 9,302,538 | B2 | * | 4/2016 | Smart | B60B 25/00 |
| 9,809,241 | B2 | * | 11/2017 | Polidoros | B62B 3/108 |
| 10,597,057 | B1 | * | 3/2020 | Hilmerson | E04G 5/001 |
| 10,843,718 | B1 | * | 11/2020 | Hilmerson | E04G 5/142 |

(Continued)

FOREIGN PATENT DOCUMENTS

| | | | | | | |
|---|---|---|---|---|---|---|
| CN | | 105480273 | A | * | 4/2016 | B62B 3/002 |
| CN | | 205668574 | U | * | 11/2016 | B62B 1/208 |

(Continued)

OTHER PUBLICATIONS

Translated CN-106585683-A (Year: 2025).*
Translated KR-200485017 (Year: 2025).*

*Primary Examiner* — James A Shriver, II
*Assistant Examiner* — Ian Bryce Shelton
(74) *Attorney, Agent, or Firm* — Michael D. Eisenberg; MDE Patents

(57) ABSTRACT

The embodiments herein are directed to a cart. The cart, which is self-powered via an electric motor residing in a box, is configured for transporting funeral arrangements. The cart efficiently and respectfully handles the movement of floral arrangements and other items, placed on a quadrilateral base of the cart, during funeral services.

15 Claims, 4 Drawing Sheets

(56)        References Cited

U.S. PATENT DOCUMENTS

| | | | | |
|---|---|---|---|---|
| 11,161,536 B2 * | 11/2021 | Yu | ............................ | B62B 3/108 |
| 11,780,485 B2 * | 10/2023 | Yu | ............................ | B62B 3/025 |
| | | | | 280/35 |
| 12,344,056 B2 * | 7/2025 | MacDonald | .......... | B62B 5/0033 |
| 2005/0040614 A1 * | 2/2005 | Johnson | ................... | B62B 3/144 |
| | | | | 280/33.991 |
| 2012/0204639 A1 * | 8/2012 | Mogridge | .............. | G01P 3/487 |
| | | | | 301/59 |
| 2013/0049441 A1 * | 2/2013 | Smart | ..................... | B60B 1/003 |
| | | | | 301/95.104 |
| 2016/0052534 A1 * | 2/2016 | Henao | ..................... | B62B 5/067 |
| | | | | 280/659 |
| 2018/0154916 A1 * | 6/2018 | Yu | ............................ | B62B 3/027 |
| 2020/0346677 A1 * | 11/2020 | Yu | ............................ | B62B 3/022 |
| 2021/0009176 A1 * | 1/2021 | Panigot | ................... | B62B 1/208 |
| 2021/0009178 A1 * | 1/2021 | Kramer | ................... | B62B 3/007 |
| 2021/0107547 A1 * | 4/2021 | Rivera | ................... | B62B 5/067 |
| 2022/0017133 A1 * | 1/2022 | Yu | ............................ | B62B 3/025 |
| 2022/0063362 A1 * | 3/2022 | MacDonald | .......... | B62B 5/0033 |
| 2025/0050930 A1 * | 2/2025 | Panah | ................... | B62B 5/0076 |
| 2025/0074491 A1 * | 3/2025 | Follmann | .............. | B62B 5/0069 |

FOREIGN PATENT DOCUMENTS

| | | | | | | |
|---|---|---|---|---|---|---|
| CN | 106585683 A | * | 4/2017 | ............... | B62B 5/04 |
| CN | 111688786 A | * | 9/2020 | ............. | B62B 5/004 |
| CN | 112874596 A | * | 6/2021 | ............. | B62B 3/02 |
| CN | 117429484 A | * | 1/2024 | ............. | B62B 3/02 |
| KR | 200450362 Y1 | * | 9/2010 | ............. | B62B 1/00 |
| KR | 200485017 Y1 | * | 11/2017 | .......... | B62B 5/0033 |
| KR | 102101433 B1 | * | 4/2020 | ............ | H02S 10/00 |

* cited by examiner

SELF-POWERED MOBILE CART

FIELD OF THE INVENTION

The present invention relates to service providing mobility apparatuses.

BACKGROUND OF THE INVENTION

There are situations where it can be very challenging, unsafe, cumbersome, and impractical to transfer items from one environment to another environment. More particularly, these items may need to be maintained in an upright position or meet other conditions, when said items are moved from one environment to another environment. Often these situations are accompanied with varying terrains making it difficult for a person or persons to carry said items.

What is needed is a service providing mobility apparatus, as provided by the systems and methods herein.

BRIEF SUMMARY OF THE INVENTION

In a variant, a cart transports flowers. The cart comprises: a quadrilateral base; a rear rail; a first side rail and a second side rail each operatively connected to the rear rail; a lever operatively connected to the quadrilateral base; a power box operatively connected to the quadrilateral base; and a first wheel, a second wheel, a third wheel, and a fourth wheel, wherein the third wheel and the fourth wheel are operatively connected to the power box.

In a variant, the first wheel, the second wheel, the third wheel, and the fourth wheel each have a tri-spoke design.

In a variant, the first side rail is parallel to the second rail.

In a variant, the rear rail comprises a top horizontal connector, a middle horizontal connector, a left pole, and a right pole.

In a variant, the middle horizontal connector is flush to a top portion of the first side rail and a top portion of the second side rail.

In a variant, the middle horizontal connector resides in between the left pole and the right pole.

In a variant, the top horizontal connector resides in between the left pole and the right pole.

In a variant, the first wheel and the second wheel are operatively connected to a first axle.

In a variant, the third wheel and the fourth wheel are operatively connected to a second axle.

In a variant, the first axle is operatively connected to the lever.

In a variant, the second axle is operatively connected to the power box.

In a variant, the power box comprises a motor.

In a variant, the cart further comprises a canopy.

In a variant, the canopy comprises solar cells integrated onto a surface of the canopy.

In a variant, the motor is powered by a set of rechargeable lithium-ion batteries.

In a variant, the cart further comprises a remote control for operating the cart.

In a variant, the quadrilateral base comprises a shock-absorbing suspension system.

In a variant, the quadrilateral base provides a low center of gravity and wide wheelbase, thereby guarding against tipping over of the cart on uneven terrain.

In a variant, the cart further comprises a left rail and a right rail, wherein the left rail and the right rail each have a net spanning respective interiors of the left rail and right rail.

In a variant, the quadrilateral base, the rear rail, the first side rail, the second side rail, the lever, the power box, the first wheel, the second wheel, the third wheel, and the fourth wheel are composed of aluminum or carbon fiber.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

Figure 1:
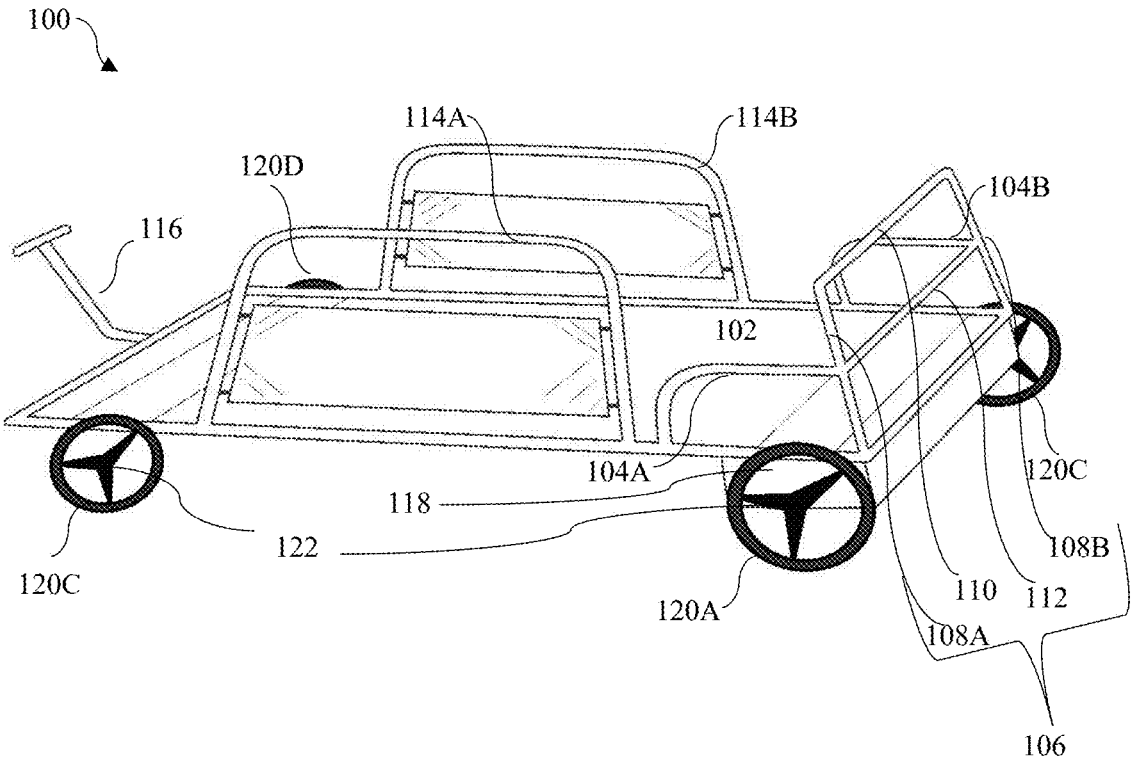
FIG. 1 depicts an isometric view of a cart with two rails attached to the outermost perimeter of the cart, in the central region of the cart.

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

The following reference numbers are used throughout the description and correspond to the elements as indicated below.

The systems and methods herein are directed to a cart, as a service providing mobility apparatus, which carries items on the cart. More particularly, cart 100 of the systems and methods herein is configured to transport items in a safe, respectful, and efficient manner. For example, the items, while moving across different terrains (e.g., concrete to brick to grass in mortuary and funeral settings), on the cart can include, but are not limited to: flowers for a funeral which need to be maintained in an upright position; containers with cleaning solutions that need be maintained in an upright position; food and beverages that does not get disrupted when wheels of the cart contact different surface (e.g., friction occurs when surfaces of varying roughness causing shock forces that can disturb the items placed on a flat surface).

In the systems and methods herein, cart 100 is a self-powered mobile cart, for transporting flowers and the other items indicated above, across different terrains of varying roughness. Cart 100 can comprise quadrilateral base 102 as a flat surface for placing the flowers and the other items indicated above. (See FIG. 1-FIG. 4.) Along the perimeter at the rear section of quadrilateral base 102, rear rail 106 is operatively connected to the rear-most perimeter of quadrilateral base 102. (See FIG. 1-FIG. 4.) In the rear section of quadrilateral base 102, side rail 104A and side rail 104B are operatively connected to quadrilateral base 102 and rear rail 106, such that: (i) side rail 104A and side rail 104B are parallel to each other, while (ii) side rail 104A and side rail 104B flank rear rail 106, to make a bracket type connection therein (]). (See FIG. 1-FIG. 4.) Side rails 104A and 104B can make a fused connection, screwed connection (e.g., male connection points in poles 108A and 108B, which operatively connect to female connection points 104A and 104B, respectively), or slot connection mechanism, to rear rail 106, wherein rear rail 106 comprises: (i) pole 108A and pole 108B in the left most and right most region of rear rail 106; (ii) bar 110 that spans across pole 108A and pole 108B in the top most region of rear rail 106; and (iii) bar 112 that spans across pole 108A and pole 108B in the center region of rear rail 106. (See FIG. 1-FIG. 4.) Side rails 104A and 104B are each identical curved appendages that operatively connect to bar 112, in a perpendicular fashion. (See FIG. 1-FIG. 4.) While side rails 104A and 104B can make an operative connection to rear rail 106 in the rear region of cart 100 that reside above quadrilateral base 100, box 118 resides in the rear region of cart 100 that resides beneath quadrilateral base 100 and quadrilateral base 100 is a separation surface between: (i) box 118 and (ii) side rails 104A and 104B operatively connected with rear rail 106. (See FIG. 1-FIG. 4.) A motor, electronics, and communication receivers reside in box 118 which allow for cart 100 to be electronically powered and remote controlled. A rear axle spans across and slightly beyond box 118, such that there are two points of connection for wheel 120A and wheel 120B, wherein wheel 120A is parallel to wheel 120B. (See FIG. 1-FIG. 4.) Lever 116 is operatively connected to the front region of cart 100, such that lever 116 can be integrated or appended to quadrilateral base 102 via a socket connection or other connection point in the front portion of quadrilateral base 102. The socket connection or the other connection point in the front portion of quadrilateral base 102 is proximal to a front axle. The front axle is beneath quadrilateral base 102, while spanning across and slightly beyond the quadrilateral base 102, such that there are two points of connection for wheel 120C and wheel 120D, wherein wheel 120C is parallel to wheel 120D. (See FIG. 2) The socket connection allows lever 116, which can have a bent orientation, to be raised, lowered, and moved in all directions. (See FIG. 2.) A person can grip level 116 at the handle thereof, which is the outermost portion of lever 116. Wheels 120A, 120B, 120C, and 120D each surround a 3-spoke design.

Figure 2:
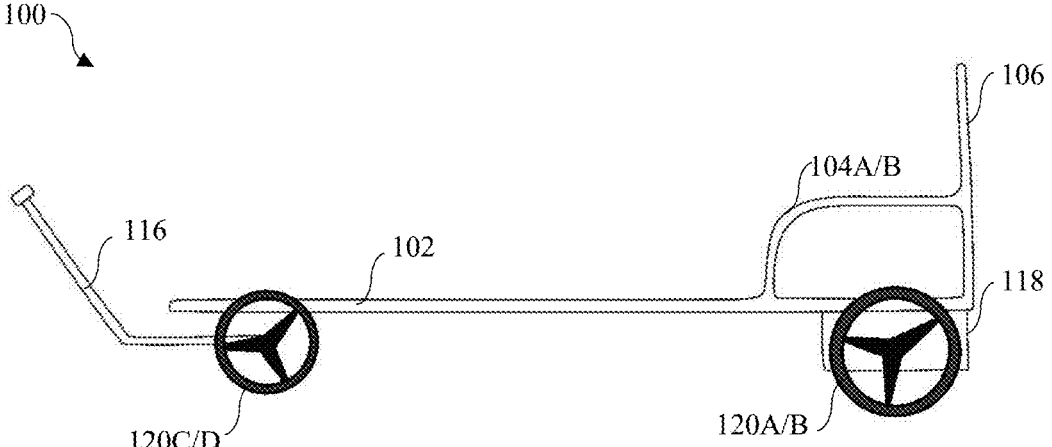
FIG. 2 depicts a front side view of a cart without two rails attached out the outermost perimeter of the cart, in the central region of the cart.
Figure 3:
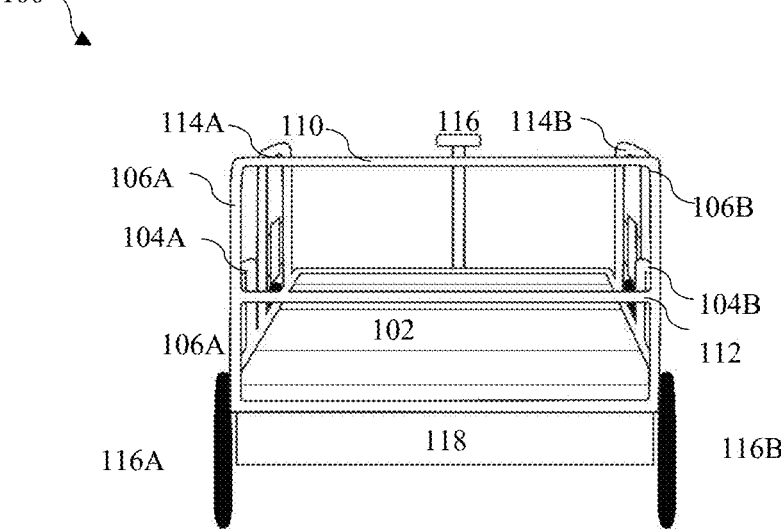
FIG. 3 depicts a left side view of a cart with two rails attached to the outermost perimeter of the cart, in the central region of the cart.
Figure 4:
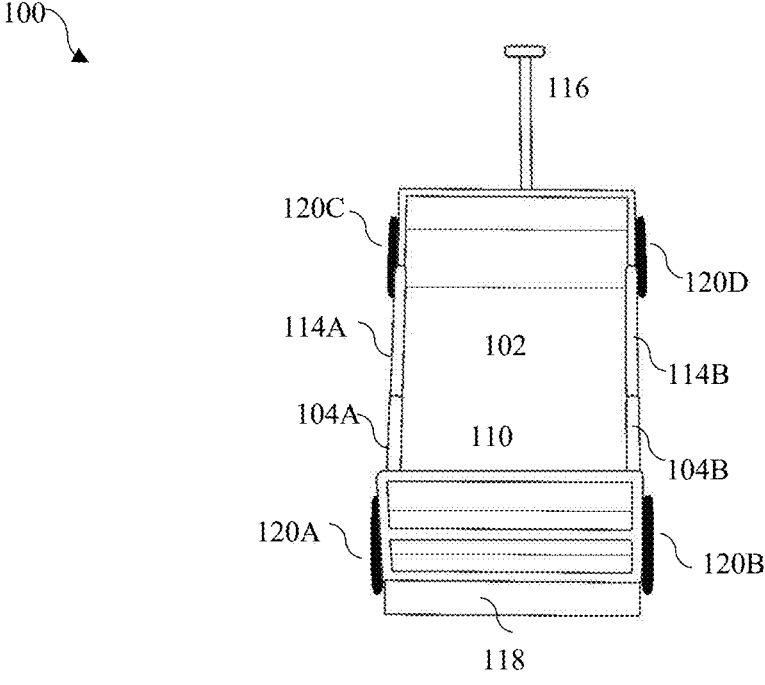
FIG. 4 depicts a top view of a cart with two rails attached to the outermost perimeter of the cart, in the central region of the cart.

In the systems and methods herein, quadrilateral base 102 can have middle rails 114A and 114B, in the middle region of cart 100, as depicted in FIG. 1, FIG. 3, and FIG. 4; or be absent of middle rails 114A and 114B, as depicted in FIG. 2. Middle rails 114A and 114B each have inverted U-shape. At the left and right most ends of middle rails 114A and 114B, a net or screen can be operatively connected thereto, such that the net or screen spans across middle rails 114A and 114B. (See FIG. 1.) Middle rails 114A and 114B with the screens provide a wall setup. The wall setup provides additional protection for items placed on quadrilateral base 102 from falling off cart 100. While not depicted, a canopy that resides at a level above quadrilateral base 102 can hover over items placed on the quadrilateral base 102. Solar panels can be integrated or installed on the canopy as an additional or alternative power source to the battery powering the motor in box 118.

In the systems and methods herein, cart 100 can be characterized by the following: a frame composed of a material that is lightweight, yet sturdy materials, such as aluminum or carbon fiber; a reliable and efficient electric motor powered by rechargeable lithium-ion batteries in box 118; wheels 120A-D that are durable, all-terrain wheels with good traction to navigate various surfaces like grass, gravel, and pavement; a remote control that is a simple and intuitive device for easy operation, including start/stop, speed control, and direction; braking system to prevent sudden movements and ensure safe stops; a shock-absorbing suspension system ensures a smooth ride, thereby protecting the delicate arrangements from jostling and damage; quadrilateral base 102 having a low center of gravity and wide wheelbase to prevent tipping over, even on uneven terrain; adjustable shelving to accommodate various sizes and types of arrangements securely; securing mechanisms, via straps or clips, to hold arrangements in place during transport; and appearance that is sleek, respectful design that aligns with the solemnity of funeral services; precisely engineered parts to ensure high quality and reliability; and extended battery life to incorporate high-capacity batteries and energy-efficient components to maximize operating time between charges.

In the systems and methods herein, cart 100 is a self-powered cart, via an electric motor in box 118, for transporting funeral arrangements, which efficiently and respectfully handles the movement of floral arrangements and other items, placed on quadrilateral base 102, during funeral services.

In the systems and methods herein, the control system in cart 100 comprises a remote control and autonomous navigation systems.

In the systems and methods herein, the electrical schematics in cart 100 comprise an electric motor, battery setup, and solar panel integration.

In the systems and methods herein, rails 104A and 104B can be removably connected to rail 106. More particularly, rails 114A, 114B, 104A, 104B, and 106 comprise respective foldable joints that operatively connect to base 102 to allow for a folded state and an extended state. Rails 104A and 104B can each disconnect from rail 106 via the screw or slidable mechanisms. In the folded state, the foldable joints are configured to allow rails 114A, 114B, 104A, 104B, and 106 to fold inwards towards base 102, such that rails 114A, 114B, 104A, 104B, and 106 can be placed on base 102 (i.e., rails 114A, 114B, 104A, 104B, and 106 are ~0 degrees in relation to base 102), when rails 104A and 104B are each disconnected from rail 106. In the extended state, the respective foldable joints are configured to allow rails 114A, 114B, 104A, 104B, and 106 to extend outwards, such that rails 114A, 114B, 104A, 104B, and 106 can be placed in a fully upright position (i.e., rails 114A, 114B, 104A, 104B, and 106 are ~90 degrees in relation to base 102), when rails 104A and 104B are each disconnected from rail 106. In this extended state, rails 104A and 104B can each be operatively connected to rail 106 at poles 108A and 108B, respectively, via the sliding or screw mechanisms. Lever 116 can be removed or attached to a socket operatively connected to the front axle connecting to wheels 120C and 120D.

In the systems and methods herein, rails 106, 104A, and 104B can be fused together. More particularly, rails 114A, 114B, 104A, 104B, and 106 comprise respective connection joints that operatively connect to base 102 to allow for an assembled state and disassembled state. Rails 104A and 104B can be fused with rail 106, thereby preventing disconnection of rail 106 from rails 104A and 104B. In the disassembled state, rails 114A, 114B, 104A, 104B, and 106 can be removed from the respective connection joints, such that three pieces are removed and not connected to base 102, wherein the three pieces are: (1) rail 114A; (2) rail 114B; and (3) the combination of rails 104A, 104B, and 106, wherein rails 104A and 104B are each operatively connected to rail 106, at poles 108A and 108B, respectively. In the assembled state, rails 114A, 114B, 104A, 104B, and 106 are placed in the respective connection joints, such that three pieces are placed and connected to base 102, wherein the three pieces are: (1) rail 114A; (2) rail 114B; and (3) the combination of rails 104A, 104B, and 106, wherein rails 104A and 104B are each operatively connected to rail 106, at poles 108A and 108B, respectively. Lever 116 can be removed or attached to a socket operatively connected to the front axle connecting to wheels 120C and 120D.

What is claimed is:

1. A cart for transporting flowers, wherein the cart comprises:
   a quadrilateral base;
   a rear rail;
   a first side rail and a second side rail each operatively connected to the rear rail;
   a lever operatively connected to the quadrilateral base;
   a power box operatively connected to the quadrilateral base;
   a first wheel, a second wheel, a third wheel, and a fourth wheel, wherein the third wheel and the fourth wheel are operatively connected to the power box; and
   a left rail and a right rail, wherein the left rail and the right rail each have a net spanning respective interiors of the left rail and right rail.

2. The cart of claim 1, wherein the first wheel, the second wheel, the third wheel, and the fourth wheel each have a tri-spoke design.

3. The cart of claim 1, wherein the first side rail is parallel to the second rail.

4. The cart of claim 1, wherein the rear rail comprises a top horizontal connector, a middle horizontal connector, a left pole, and a right pole.

5. The cart of claim 4, wherein the middle horizontal connector is flush to a top portion of the first side rail and a top portion of the second side rail.

6. The cart of claim 4, wherein the middle horizontal connector resides in between the left pole and the right pole.

7. The cart of claim 4, wherein the top horizontal connector resides in between the left pole and the right pole.

8. The cart of claim 1, wherein the first wheel and the second wheel are operatively connected to a first axle.

9. The cart of claim 1, wherein the third wheel and the fourth wheel are operatively connected to a second axle.

10. The cart of claim 8, wherein the first axle is operatively connected to the lever.

11. The cart of claim 9, wherein the second axle is operatively connected to the power box.

12. The cart of claim 1, wherein the power box comprises a motor.

13. The cart of claim 12, wherein the motor is powered by a set of rechargeable lithium-ion batteries.

14. The cart of claim 1, wherein the quadrilateral base provides a low center of gravity and wide wheelbase, thereby guarding against tipping over of the cart on uneven terrain.

15. The cart of claim 1, wherein the quadrilateral base, the rear rail, the first side rail, the second side rail, the lever, the power box, the first wheel, the second wheel, the third wheel, and the fourth wheel are composed of aluminum or carbon fiber.

\* \* \* \* \*